US008481143B2

(12) United States Patent
Dean et al.

(10) Patent No.: US 8,481,143 B2
(45) Date of Patent: Jul. 9, 2013

(54) THICK CURVED HONEYCOMB CORE WITH MINIMAL FORMING

(75) Inventors: Thomas Andrew Dean, Maple Valley, WA (US); Brenda C. Benedetti, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/214,848

(22) Filed: Aug. 22, 2011

(65) Prior Publication Data

US 2013/0052396 A1 Feb. 28, 2013

(51) Int. Cl.
*B32B 3/12* (2006.01)
*B32B 3/00* (2006.01)

(52) U.S. Cl.
USPC .............................. 428/80; 428/116; 428/121

(58) Field of Classification Search
USPC .................................... 428/80, 116, 121, 130
See application file for complete search history.

(56) References Cited

U.S. PATENT DOCUMENTS 2,704,587 A 3/1950 Pajak
3,086,624 A 4/1963 Wyatt
3,196,533 A 7/1963 Ida
3,460,233 A 2/1966 Pfaffenberger
3,616,141 A 10/1971 Anderson
4,273,836 A * 6/1981 Campbell et al. ............. 428/595
4,457,963 A 7/1984 Ittner et al.
4,548,665 A 10/1985 Morin
4,981,744 A 1/1991 Swank
5,024,369 A 6/1991 Froes
5,064,493 A 11/1991 Smith
5,126,183 A 6/1992 Smith
5,150,507 A * 9/1992 Goela et al. ..................... 29/460
5,270,095 A 12/1993 Ito
6,372,322 B1 4/2002 Devaguptapu

FOREIGN PATENT DOCUMENTS

EP 0474161 A2 3/1992
JP 58-25531 5/1983

OTHER PUBLICATIONS

European Search Report in a corresponding European Patent Application No. 12181293.7, published by the European Patent Office, Mar. 18, 2013.

* cited by examiner

*Primary Examiner* — Alexander Thomas

(74) *Attorney, Agent, or Firm* — Ostrager Chong Flaherty & Broitman P.C.

(57) ABSTRACT

A ribbon for manufacturing a honeycomb structure, a honeycomb structure and a method of manufacturing a curved honeycomb structure having a plurality of honeycomb cells, a curved geometry and an inner and outer surface with minimal forming. The ribbon comprises a continuous series of foldable sections arranged in sequence along the length of the ribbon, and top and bottom edges curved along the length of the ribbon when the ribbon is in a flat, unfolded state. Each section may have a top edge and a bottom edge, at least one top edge or bottom edge of at least one section in said continuous series of foldable sections being curved to conform to said curved geometry of said honeycomb structure.

31 Claims, 8 Drawing Sheets

THICK CURVED HONEYCOMB CORE WITH MINIMAL FORMING

TECHNICAL FIELD

This disclosure relates generally to honeycomb structures and more specifically to curved honeycomb core structures manufactured using minimal forming stresses, processes and equipment.

BACKGROUND

Honeycomb structures, also referred to herein as "honeycomb core," "core material" or simply "core," typically comprise a plurality of abutting rectangular or hexagonal cells shaped to a desired form. Honeycomb structures are often used as structural support for their high strength to weight ratio due to the low density of the honeycomb formation.

Honeycomb structures are typically manufactured from a thin, flat base material such as metal or paper. The flat base material is cut into narrow, elongated strips or ribbons, which are folded or bent into contoured strips of semi-hexagonal peaks and troughs. For example, an elongated strip of a material may be scored at regularly spaced intervals. To form regular hexagonally shaped cells, the score lines would be parallel to the ends of the strip and the material would be folded along the score lines to an angle of 60° twice in one direction and then twice in the opposite direction, and continuously alternating in that fashion.

The resulting folded strips are then joined together by adhesive, spot welding, brazing or other known joining methods to form a structure having a series of hexagonally shaped cells, thereby forming a flat honeycomb core structure. Although cells in a honeycomb core structure are typically hexagonal, honeycomb core structures may also be formed from cells having non-hexagonal shapes.

The resulting honeycomb core structure, which consists of a flat core structure having cells with walls oriented in a direction perpendicular to the flat surface of the core structure, is able to sustain large loads in a direction parallel to the walls of the honeycomb cells, while being lightweight due to an absence of material within the cells.

In many applications, it is desirable to form a honeycomb structure that does not have a flat contour, but is contoured to some other shape. Various methodologies and apparatuses have been developed for shaping honeycomb core to particular contours.

Some methods for forming contoured honeycomb structures begin with a pre-formed flat honeycomb core and then mold or form the flat core into a desired shape.

For example, one method of producing a contour consisting of short angle bends in a honeycomb structure consists of first manufacturing a flat honeycomb core material. A force is applied to cells of the flat honeycomb structure to deform or collapse the honeycomb cells in the area in which the short angle bend is desired. This results in a honeycomb structure having a short radius bend area possessing cells with a height similar to the height of cells in the non-collapsed area.

Other methods of contouring core material consist of passing a preformed, flat honeycomb core material through a series of rollers that deforms the hexagonal cells and allows them to be bent in different directions.

Still further methods of forming core material into a desired shape consist of beginning with a flat core material and forcing the core material against and into a die having the required contour.

All of the foregoing methodologies require the application of force to a flat honeycomb structure in order to form it into a desired shape, which may lead to undesirable stresses in the honeycomb structure, and the strength and stiffness of the core are sacrificed due to the fact that the honeycomb cell walls are no longer normal to the surface of the core.

Other methods generally avoid bending or folding a fully assembled honeycomb core material. Instead, these methods begin by forming flat, rectangular strips having a plurality of sections along the length of the strips, the sections being separated by fold lines. The strips are folded at the fold lines and joined together to form a desired honeycomb contour shape without additional application of force to the honeycomb core.

For example, some methods contemplate the formation of a honeycomb structure having hexagonally shaped cells wherein some cell walls possess a tapering V-shaped crimp. By placing all crimped edges on one side of the honeycomb structure, and all non-crimped edges on the opposite side of the honeycomb structure, the crimped side is made to be shorter than the non-crimped side. This facilitates variation in the radii of curvature of the honeycomb structure, which leads to a curved core material.

Other methods contemplate forming rectangular strips wherein the fold lines are placed along the length of the strips, such that the sections between the fold lines are not regularly shaped. Fold lines are placed in the strips such that when folded, the entire edges of the strips form an overall curved structure. When the folded strips are adhered together, the resulting core material has a desired contour. For example, Japanese Laid-Open Patent Publication No. 58-25531 and U.S. Pat. No. 5,270,095 disclose strips having some fold lines perpendicular to the length of the strip and other fold lines that are slanted in relation to the length of the strip. In a flat or unfolded state, the edges of the strip are straight and form a rectangle. In a folded state, the slanted fold lines create a folded strip with straight edges that form an overall curved structure determined by the angle of the slant in the fold lines. However, this process has limited utilization in that it can be used to manufacture honeycomb core having only a single shape.

What is needed is a simplified method of manufacturing contoured honeycomb structures that does not introduce undesired stresses or sacrifice strength and stiffness of the structure, and permits formation of contoured honeycomb core in a wide variety of shapes and sizes with minimal forming steps to provide manufacturing cost and time efficiencies.

SUMMARY

The foregoing purposes, as well as others that will be apparent, are achieved generally by providing a ribbon for manufacturing a honeycomb structure having a plurality of honeycomb cells, an inner core surface, an outer core surface, and a curved core surface geometry. The ribbon comprise a ribbon top edge, a ribbon bottom edge and a continuous series of foldable sections arranged in sequence along the length of the ribbon, the ribbon top edge and the ribbon bottom edge being curved along the length of the ribbon when the ribbon is in a flat, unfolded state. Alternatively, each of the foldable sections has a top edge and a bottom edge, and the top edge or bottom edge of at least one section in the continuous series of foldable sections is curved to match the curved geometry of said honeycomb structure.

In another aspect of this disclosure, a honeycomb structure having a plurality of honeycomb cells, an inner core surface, an outer core surface and a curved core surface geometry is provided. The honeycomb structure comprises a plurality of ribbons aligned in the direction of a ribbon orientation and folded to form a continuous series of half-cells, each half-cell having a shape approximately equivalent to half of the shape of a honeycomb cell in said plurality of honeycomb cells. The ribbons are lined up side-by-side to form a plurality of honeycomb cells in the desired shape without additional forming steps or stresses. The ribbons comprise one or both of the ribbon structures identified above.

In yet another aspect of this disclosure, a method of manufacturing a curved honeycomb structure is provided, comprising determining an inner surface shape for an inner surface of the curved honeycomb structure and an outer surface shape for an outer surface of the curved honeycomb structure, determining a honeycomb cell shape for a plurality of honeycomb cells, determining a plurality of ribbon shapes of each of a plurality of ribbons for forming said plurality of honeycomb cells, cutting a plurality of ribbons from a base material, the ribbons having the determined shapes, aligning said plurality of ribbons side-to-side and joining adjacent ribbons together to facilitate creation of the curved honeycomb structure from said plurality of ribbons.

In yet another aspect of this disclosure, a honeycomb structure having a cylindrical shape with an axis, an inner radius, an outer radius, an inner cylindrical surface, an outer cylindrical surface and a thickness is provided, comprising a plurality of ribbons arranged side by side, each ribbon having an inner edge and an outer edge, both running along a length of the ribbon, and comprising a continuous series of alternating rectangular sections and trapezoidal sections along the length of the ribbon, said trapezoidal sections having an elliptical top edge at the outer edge of the ribbon, and an elliptical bottom edge at the inner edge of the ribbon, the ribbon being bent along borders between the rectangular and trapezoidal sections to form a series of semi-hexagonal shapes, the rectangular sections of adjacent ribbons being joined together to form the cylindrical shape of the honeycomb structure.

In yet another aspect of this disclosure, a method of manufacturing a honeycomb structure having a cylindrical shape is provided, comprising providing a plurality of ribbons, each ribbon having an inner edge and an outer edge, both running along a length of the ribbon, and comprising a continuous series of alternating rectangular sections and trapezoidal sections along the length of the ribbon, said trapezoidal sections having an elliptical top edge at the outer edge of the ribbon, and an elliptical bottom edge at the inner edge of the ribbon, the ribbon being bent along borders between the rectangular and trapezoidal sections to form a series of semi-hexagonal shapes, arranging said ribbons side by side, and joining the rectangular sections of adjacent ribbons together to form said cylindrical shape of the honeycomb structure.

Other objects, features and advantages will be apparent when the detailed description of the preferred embodiments is considered in conjunction with the drawings.

BRIEF DESCRIPTION OF THE DRAWINGS

Reference will now be made to the drawings, in which similar elements in different drawings bear the same reference numerals.

DETAILED DESCRIPTION

The following disclosure describes improved methods and materials for manufacturing a curved honeycomb core having a desired geometrical shape from a plurality of ribbons with minimal forming steps and stresses, including methods for determining preferred ribbon geometries for manufacturing a curved honeycomb core having a desired shape. It will be understood by those skilled in the art that the principles of the methods and materials disclosed herein may be applied to form a wide variety of ribbon geometries and, thus, honeycomb core structures having a wide variety of geometrical shapes. As used herein, the terms “geometry” or “geometries” or “geometrical”, when referring to ribbons means the shape and size of the ribbon, placement of fold lines in the ribbon and the structure of the ribbon edges (e.g., straight edge or curved edge), and when referring to honeycomb core, means the shape and size of the core, the shape and size of cells within the core and the structure of the core’s inner and outer surfaces (e.g., curved or straight) and the core’s axis.

For example, and without limitation, the principles disclosed herein may be applied to form honeycomb core having desired curved, geometrical shapes including any radial portion of (such as a “semi-cylindrical” tube having a semi-circular cross-section) or the whole of a cylinder having an arbitrary curvature. Generally, cylindrical shapes have a central axis, and outer and inner surfaces, which together define a thickness. Both the thickness and the axis may vary from point to point on the cylinder. In other words, the axis of the cylindrical shape may have curvature that changes along its length and the thickness of the cylindrical shape may vary as well. The cross-sectional shape of the cylinder, taken by a plane having a normal parallel to the axis of the cylinder, may also vary along the length of the axis, and may have varying eccentricity, radii, and other parameters. Therefore, as used herein, the terms “cylinder” or “cylindrical” are not limited to a regular cylinder having a straight axis and a constant circular cross-section, but can refer to any of a variety of tubular geometries having a varying cross-section surrounding a straight or curved axis including, for example, a curved radome, a cone shape or other cylindrical shapes. The terms “cylinder” or “cylindrical” and “tube” or “tubular” may be used interchangeably throughout this specification. It will be appreciated that variations in the geometry, composition and construction of such honeycomb core can be adapted depending on their intended use in accordance with the teachings of this disclosure.

Figure 1:
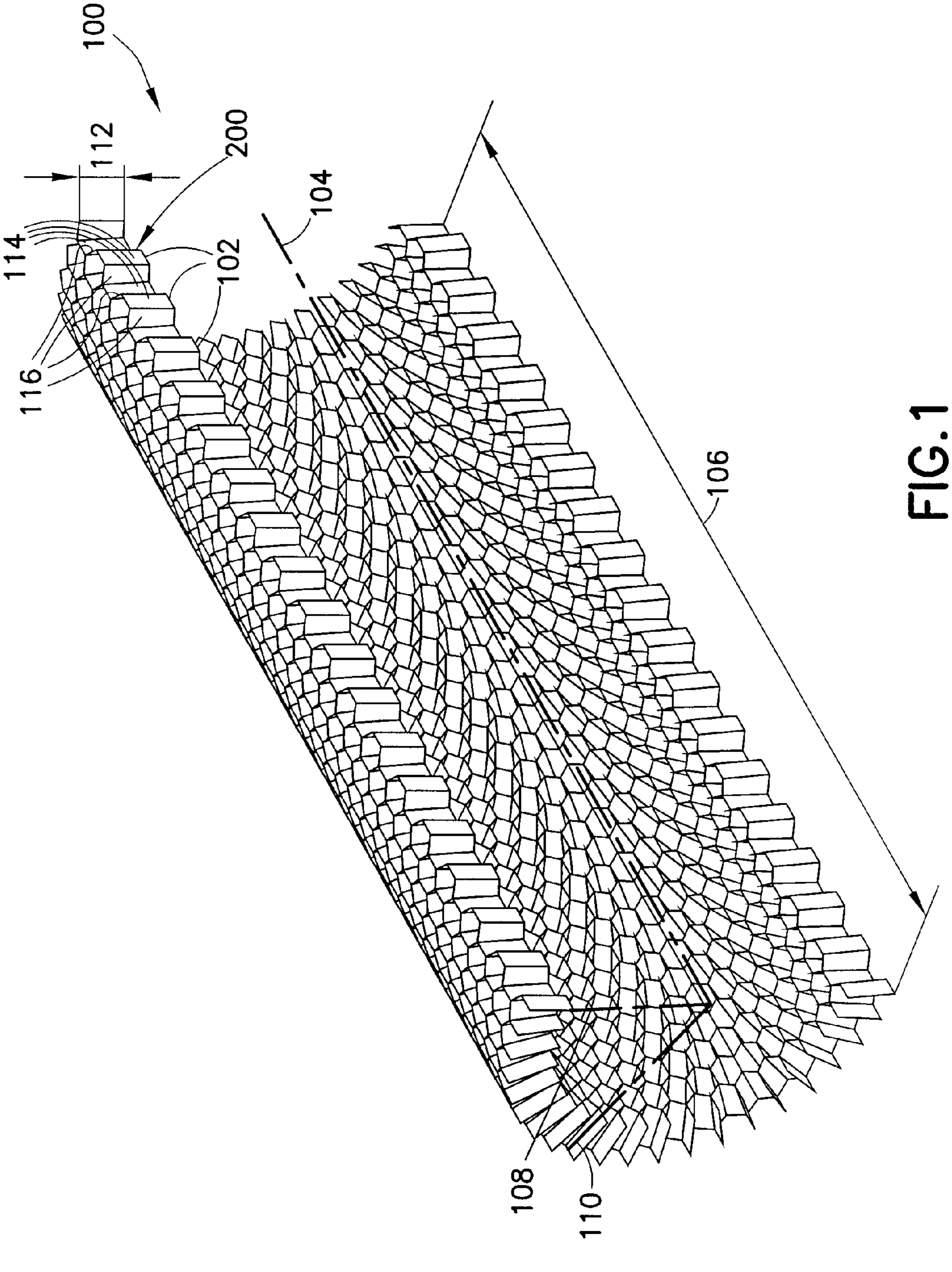
FIG. 1 is an illustration showing a perspective view of an example honeycomb core made using the teachings of this disclosure.

An example honeycomb core 100 made using the principles of this disclosure is shown in FIG. 1. For ease of description, the core 100 is shown in the shape of a regular cylinder having a straight axis 104 and a thickness 112. The core 100 comprises a series of folded ribbons 200 joined in a side-by-side manner. The ribbons 200 are shaped precisely so that when folded and joined together, they form the desired curved honeycomb geometry, including a series of abutting hexagonally shaped cells 102 extending from an outer surface of the core to an inner surface of the core and having a thickness 112. With a sufficient number of ribbons 200 joined in this fashion, any portion of a cylindrical geometry having desired curvatures may be formed.

Figure 5:
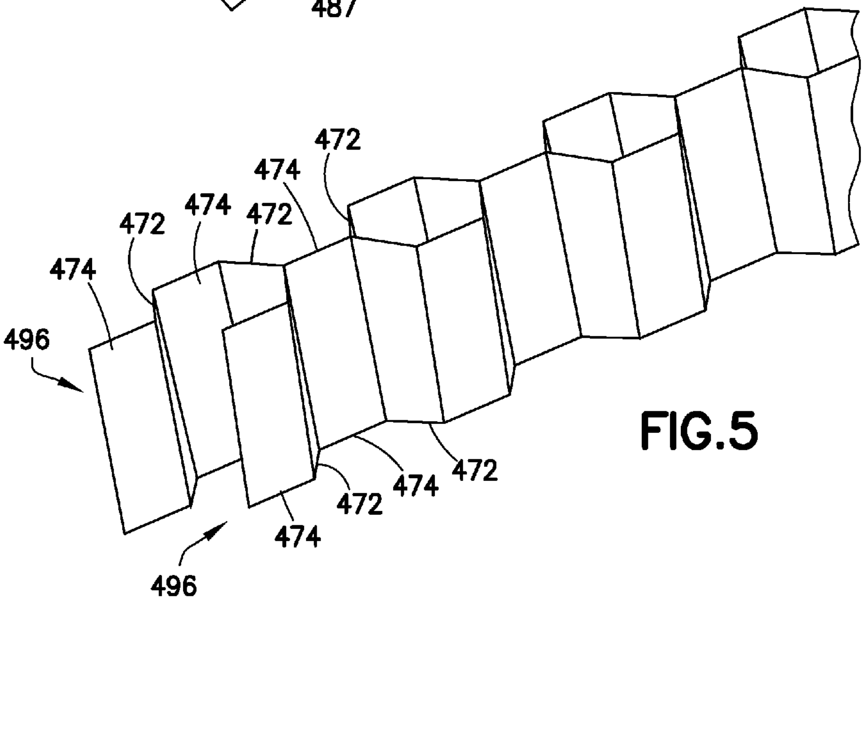
FIG. 5 is an illustration showing a perspective view of a plurality of ribbons joined together to make a honeycomb core.

Each of the abutting cells 102 comprises a plurality of walls, including node walls and non-node walls, and top and bottom hexagonally shaped faces corresponding to the outer and inner surfaces of the core, respectively. Node walls 114 are walls that provide surfaces for two adjacent ribbons 200 to be joined together, as shown in FIG. 5. Non-node walls 116 are all other walls that comprise the cells 102. As described below, the node walls 114 are tapered inward from the top face to the bottom face such that the top face has an area that is greater than the bottom face and the cell 102 has a tapered wedge shape. Unlike methods of making curved honeycomb core from flat core, which may require strong forces to be applied to a flat honeycomb core, the methods and materials provided herein allow the manufacture of a honeycomb core having a desired curvature without the application of strong forces and with minimal forming.

Figure 4A:
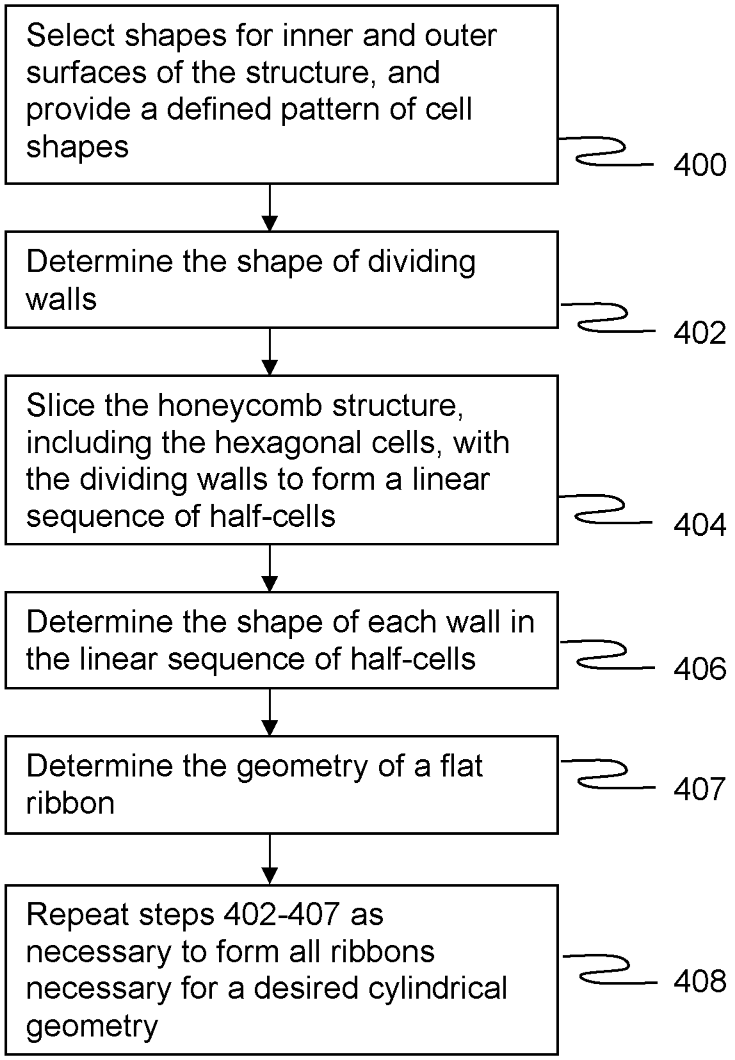
FIG. 4A is an illustration of the steps used in a first embodiment of a method for determining the shape of a ribbon used to make a honeycomb core.
Figure 4B:
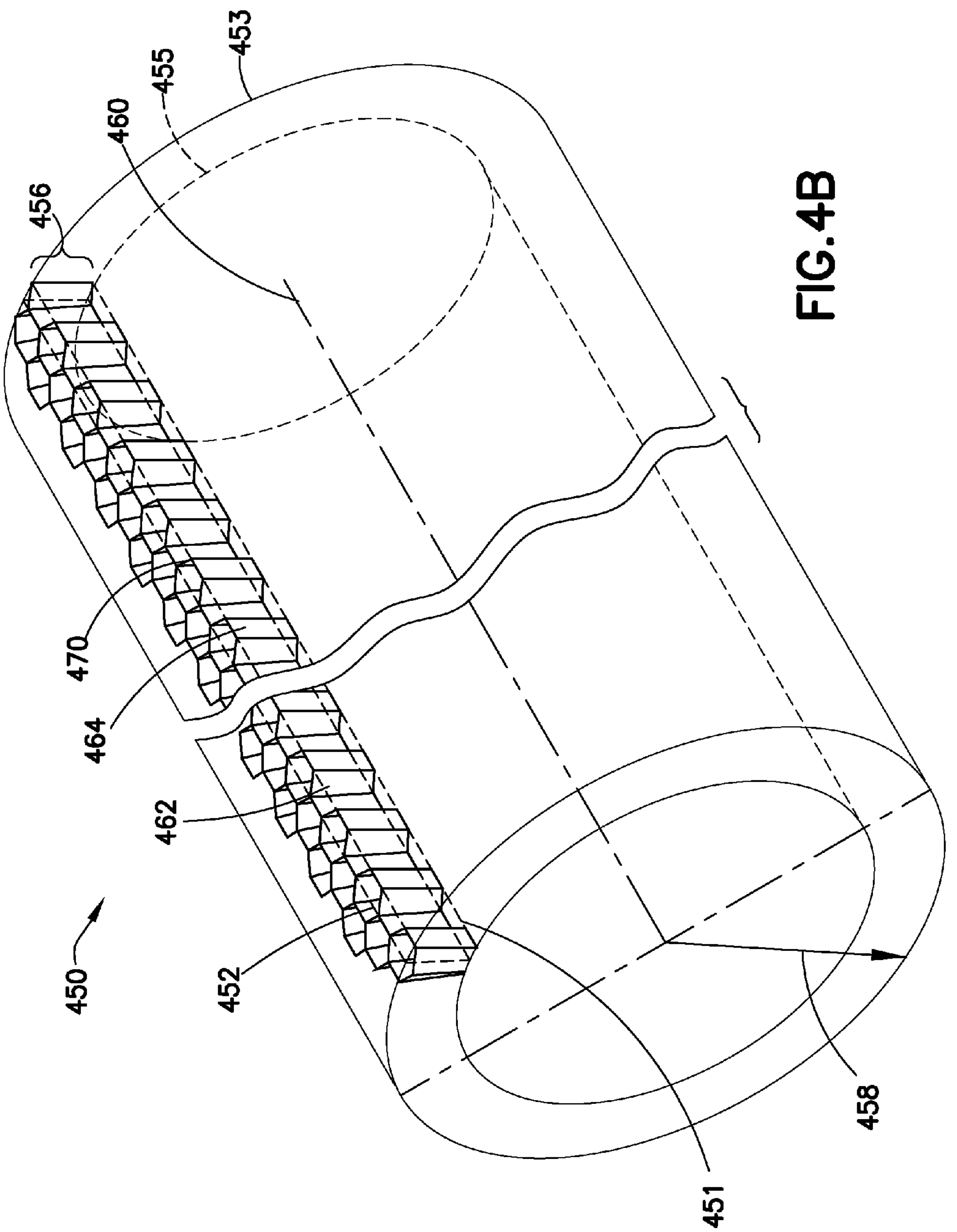
FIG. 4B is an illustration depicting determining the shape of a ribbon used to make a honeycomb core.
Figure 4C:
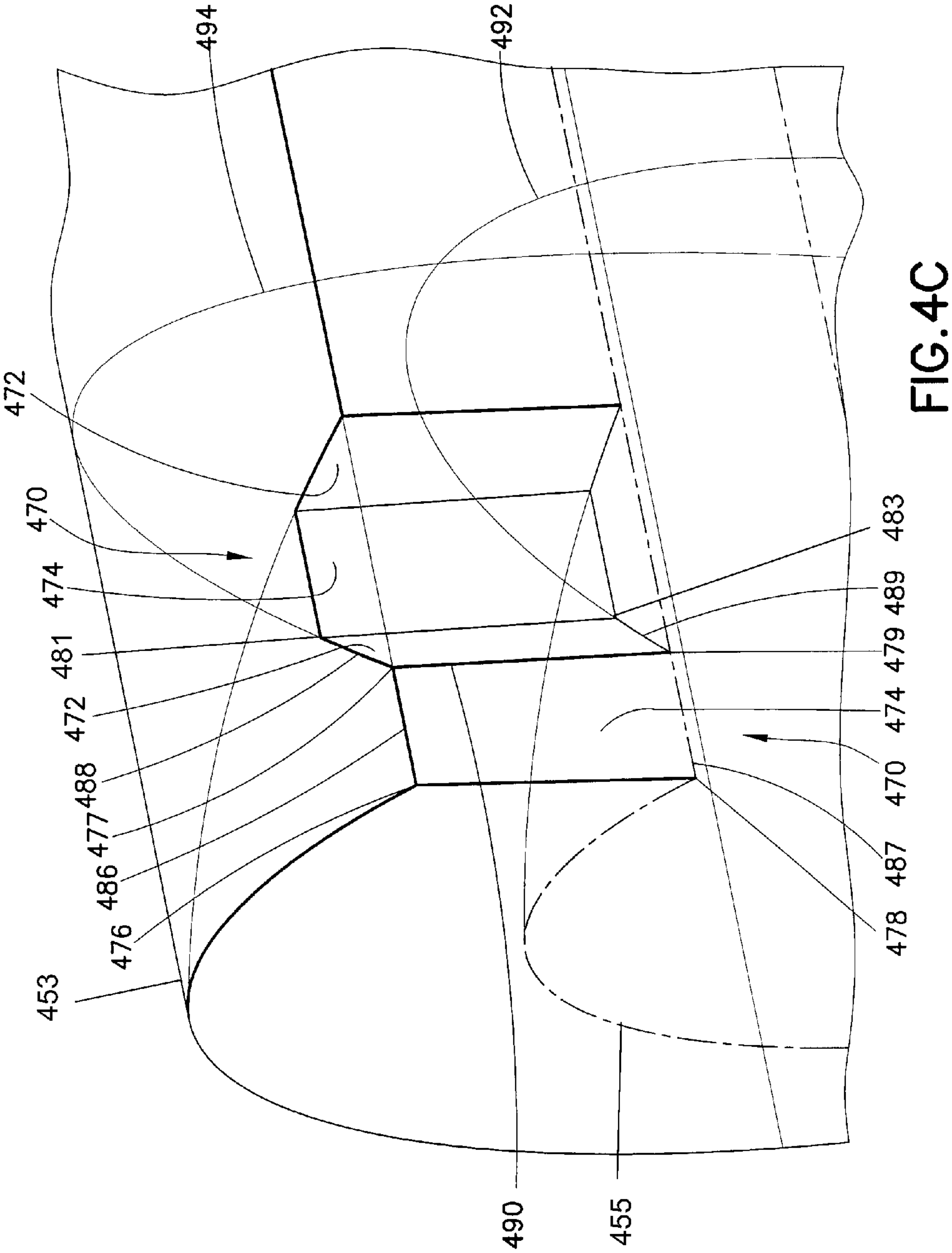
FIG. 4C is an illustration depicting determining the shape of sections of a ribbon used to make a honeycomb core.
Figure 4D:
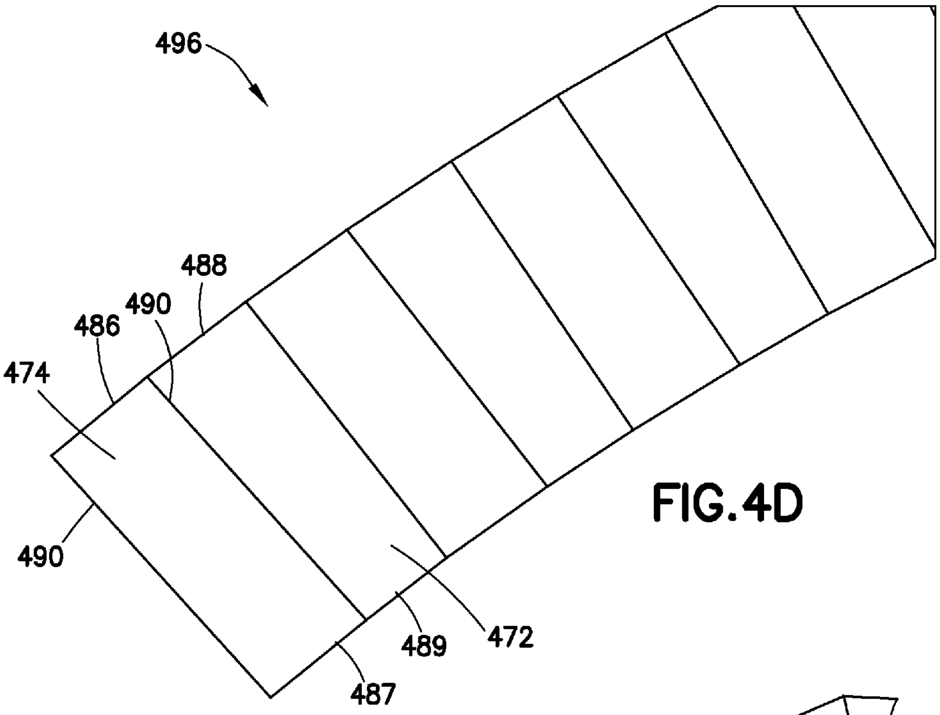
FIG. 4D is an illustration of geometry consisting of the shape of a flat ribbon used to make a honeycomb core.

A close-up of a specific example of a ribbon geometry 496 that may be used to form the regular cylinder honeycomb core shown in FIG. 1 can be seen in FIG. 4D. The ribbon 496 is in an un-folded or flat state. Because the cylinder 100 is regular, the geometry of the ribbon 496 is also regular—it comprises a repeating series of rectangular sections 474 followed by trapezoidal sections 472. However, it should be understood that for less regular core geometries, the geometry of the ribbon is not necessarily regular. Thus, for an irregularly shaped honeycomb core, ribbons may comprise a series of sections having shapes that are different from each other. The term "sections" as used herein refers to the discrete shapes, such as rectangle 474 and trapezoid 472, that comprise the ribbons. In the rectangular sections 474, the top and bottom edges are straight and perpendicular to the fold lines that form the side edges of the sections. In the trapezoidal sections 472, the top and bottom edges are curved to conform to or match the curvature of the inner and outer surfaces of the formed honeycomb core.

As described above, these section shapes may vary depending on the desired geometry of the honeycomb core. It should be understood that the geometry of the ribbon is defined by the shape of these sections. For example, the geometry of the ribbon 496 in FIG. 4D is defined by the fact that a rectangular section having a defined shape is joined to a trapezoidal section having a defined shape, and so forth. A consequence of this particular combination of section shapes is that the edges of the ribbon as a whole are "curved" along the length of the ribbon when the ribbon is in a flat or unfolded state. However, this curvature is not necessarily found in all ribbon geometries that may be used in accordance with the principles of this disclosure. When folded, however, the edges of the folded ribbon are straight.

In addition to being defined by the geometry of the honeycomb core 100, the geometry of the ribbon 496 is also defined by the shape of the cells 102. In FIG. 1, these cells are elongated, tapered hexagonal cells. Preferably, the shape of these cells is determined, and then the geometry of the ribbons is determined based on the shape of the cells. This is described in greater detail with respect to FIGS. 3A-3B and 4A-4D below. FIG. 4B discloses one preferred method for determining the geometry of a ribbon.

A common feature among ribbons having different geometries that are formed in accordance with the principles in this disclosure is that the edges of each of the sections of the ribbons are designed to exactly or very nearly match the shape of the portion of the honeycomb core which it forms. For the example ribbon depicted in FIG. 4D, edge 488 is curved. When this ribbon 496 is folded, as shown in FIG. 4C, which depicts a close-up view of a portion of a folded ribbon embedded within a regular cylinder, edge 488 matches the curvature of the portion of the outer surface of the honeycomb core that it forms. This curvature is represented by ellipse 494. As can be seen, edge 488 matches the curvature of this ellipse 494, which denotes the curvature of the cylindrical surface in the direction of edge 488. It can also be seen that edge 486, which is not curved, but straight, matches the shape of the portion of the outer surface of the honeycomb core that it forms. Because edge 486 is parallel to the axis of the cylinder, and because the cylindrical surface is simply a straight line in that direction, edge 486, which "matches" this straight line, is not curved. A detailed description of the methodology for determining the geometries of the ribbons, edges and sections is disclosed below.

The shapes of various objects discussed herein may be determined using geometrical principles. Some of the geometrical determinations may be made using basic mathematical principles. However, for complex shapes, while basic mathematical principles may be used, it is considered more practical to determine the shapes of such objects using numerical methods. As one of the most powerful tools for using numerical methods to determine complex geometrical shapes is 3D CAD software, some of the disclosure provided herein will make reference to operations conducted on such software. Virtually any 3D CAD software package capable of performing such operations or equivalents should be suitable to the task of making the geometrical determinations disclosed herein. One such software package is CATIA from Dassault Systèmes of Vélizy-Villacoublay, France.

A procedure for manufacturing a honeycomb core with a desired curved geometry will now be described with reference to FIGS. 2-5.

Figure 2:
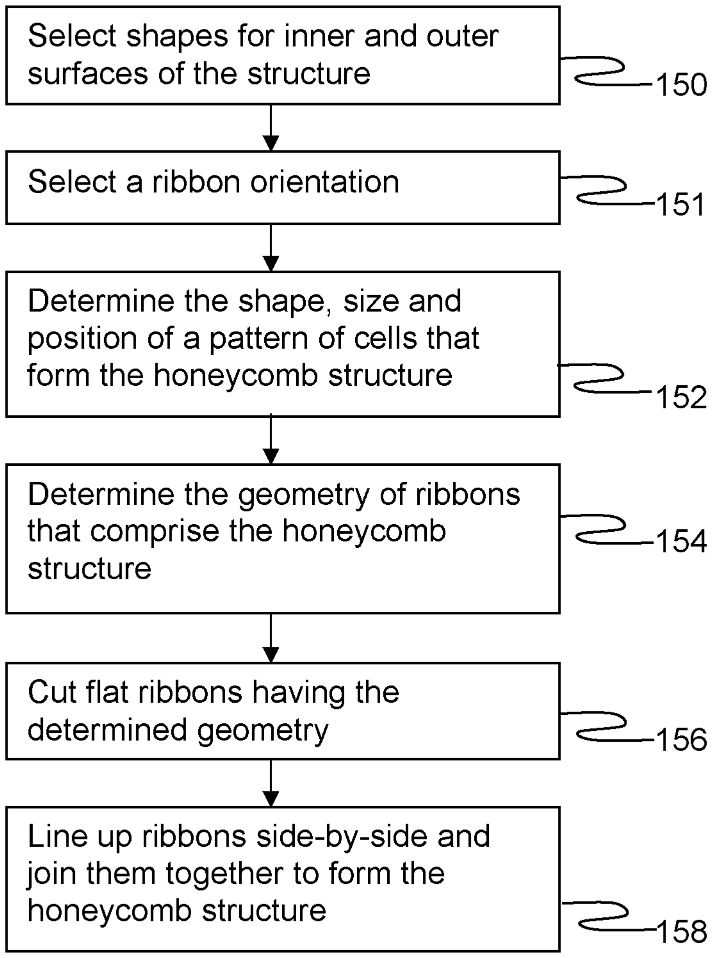
FIG. 2 is an illustration of steps of a method of manufacturing a honeycomb core using the teachings of this disclosure.

A general process for forming a honeycomb core is described in FIG. 2. This process makes reference to various geometrical shapes that may be represented mathematically or using a computer model.

In step 150, the shapes of outer and inner surfaces of a honeycomb core to be constructed are selected. These surfaces represent outer and inner walls of the final product that will be manufactured using the methodologies of this disclosure. A desired tubular shape is therefore provided in the form of mathematical parameterizations, or 3D CAD computer models, for an inner and outer surface of the desired tubular shape. It should be understood that this tubular shape may be any of a wide variety of curved cylindrical geometries.

In step 151, a ribbon orientation is selected. This is the direction along the honeycomb core at which ribbons will lie. The ribbon orientation relates to the shape of the cells of the honeycomb core as well as the geometries of the ribbons themselves. Preferably, a ribbon orientation should be selected such that the honeycomb core can be made using the smallest number of different ribbon geometries. It is desirable to use as few ribbon geometries as possible to provide cost and manufacturing time efficiencies. This can be done by determining a direction in which the cylinder has symmetry, and then selecting the ribbon orientation such that it is aligned with that symmetry. If this is optimally done, ribbons of identical geometry may be used to form the entire cylindrical core. This is described in further detail below, with respect to FIGS. 3A-3B and 4B-4D.

In step 152, the shape, size and position of a pattern of cells that form the honeycomb core is determined. Each cell has inner and outer faces, which lie on the inner and outer surfaces of the cylindrical core, respectively. The shape of the cells may be pre-known or pre-determined. Alternatively, the shape of the cells may be determined using the procedures disclosed with reference to FIGS. 3A and 3B, below. The geometry of the ribbons to be determined is based on the determined shape of the cells.

Generally, it is beneficial for the cells 102 to be shaped and positioned such that they form a staggered series of interlocking cells 102, as shown for example in FIG. 1. This is typically done by choosing hexagonally shaped cells, but a wide variety of interlocking cell types are known and may be employed with the teachings of this disclosure. Any polygonal shape may be used, including shapes having curved edges. Preferably, the cells are shaped such that node-walls are generally parallel to the ribbon orientation, to facilitate connection between adjacent ribbons. One example of a non-hexagonal shape can be found in the standards document for product code number AMS4177 from SAE International of Warrendale, Pa., USA. The cell shape described in that document has an irregular shape, which may be described as "sombrero" having a wide, curved, bowl-shaped bottom portion and a narrow triangular top portion. These shapes form an interlocking pattern of cells in which the space between two bowl-shaped portions of adjacent cells is identical to the shape of the narrow triangular top portion of another cell in a staggered position, and similarly, the space between two narrow triangular top portions in adjacent cells is identical to the shape of the bowl-shaped bottom portion of another cell in a staggered position.

In step 154, the geometry of the ribbons that comprise the cylindrical honeycomb core is determined based on the pattern of cells determined in step 152. The methodology for determining the geometry of these ribbons is described in more detail with reference to FIGS. 4A-4D below.

It is contemplated that both steps 152 and 154, in which geometrical shapes of physical objects are determined, may be performed using mathematical principles, computer methods or some combination of both.

In step 156, flat ribbons are cut out of a desired material to the geometry specified in step 154.

In step 158, the cut ribbons are lined up side-by-side and adjacent ribbons are joined together at the node walls. The ribbons may be pre-folded prior to being joined together. Alternatively, the ribbons may be pre-stressed along fold-lines, joined together while flat prior to folding, and subsequently expanded to a desired shape. As used herein, "pre-stressed" means that ribbons are scored or pre-bent such that when an appropriate force is applied, the ribbons bend at the fold lines. By virtue of the geometry of the ribbons, a desired core geometry is formed. Alternatively, the ribbons need not be pre-stressed. Instead, when two ribbons are joined together, the portions of the ribbons which are joined together (i.e., the node-walls) are stronger and/or stiffer than the other portions of the ribbons. When a joined stack of ribbons is expanded, the non-joined portions bend while the joined portions stay substantially rigid. The expanded stack of ribbons will thus form the desired cell shapes. The process of lining up and joining the ribbons is explained in further detail below with respect to FIG. 5.

Figure 3A:
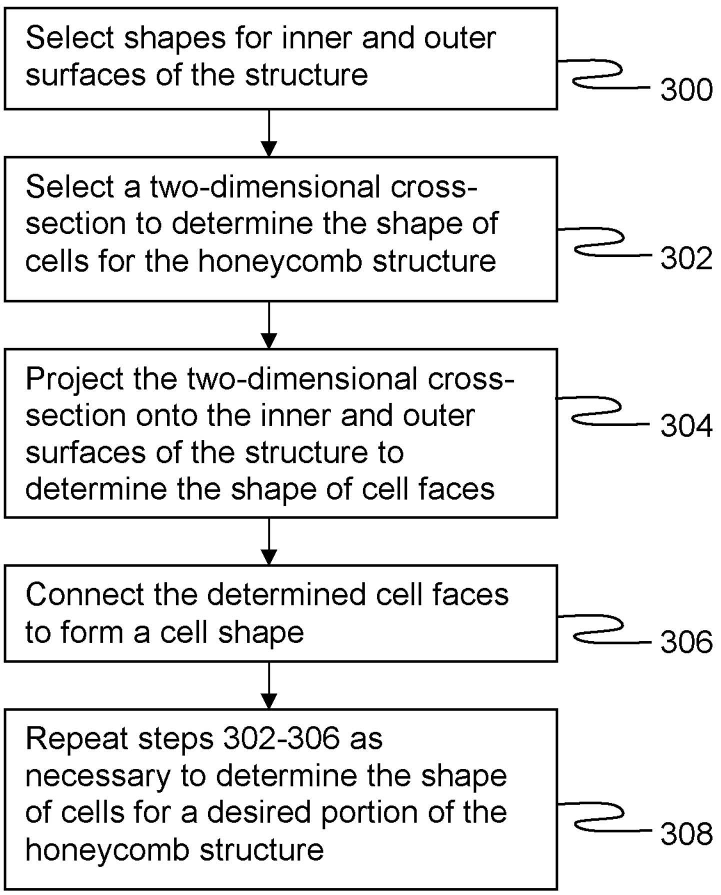
FIG. 3A is an illustration of the steps used in a first embodiment of a method for determining the shape of cells in a honeycomb core.
Figure 3B:
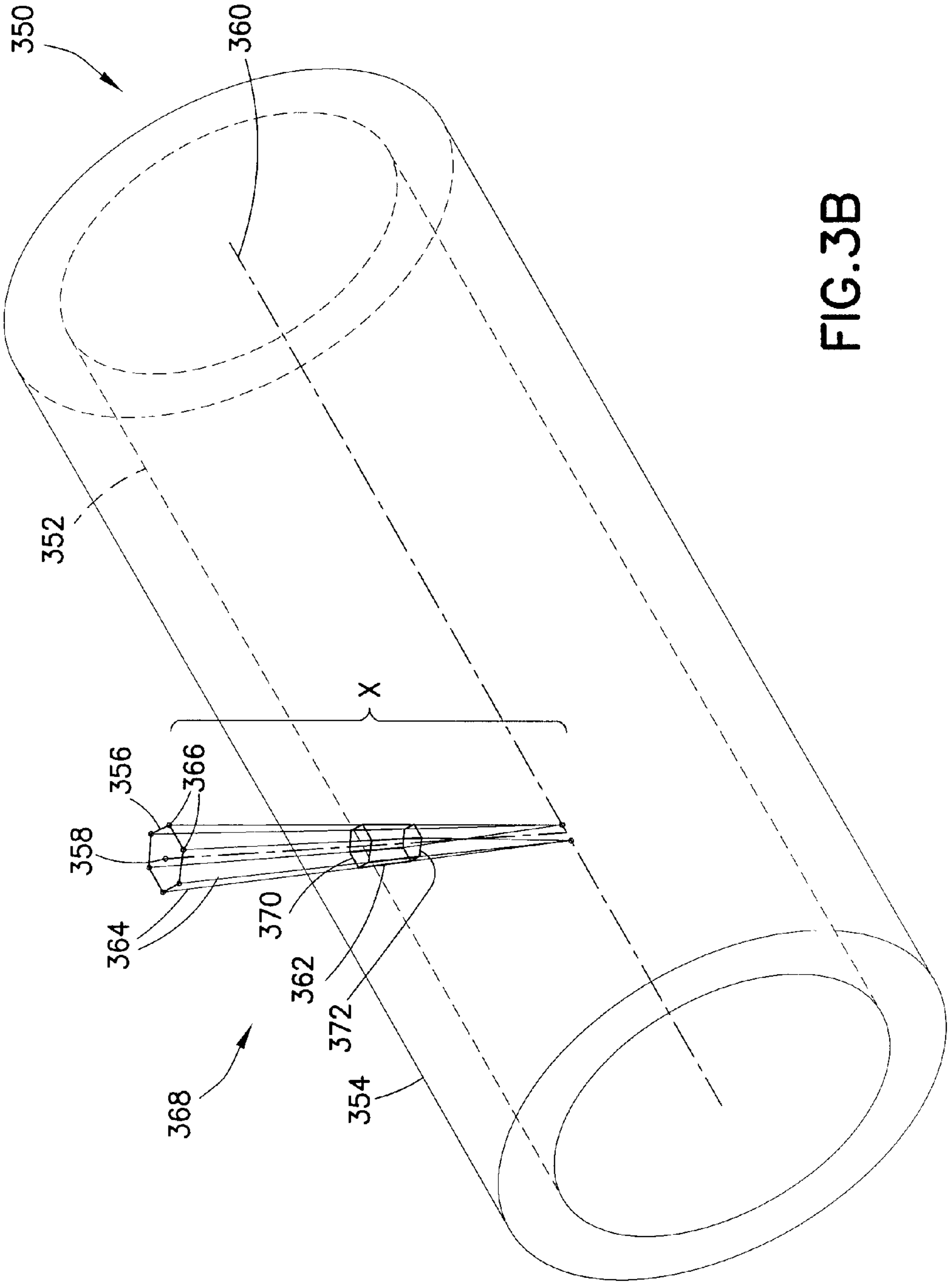
FIG. 3B is an illustration depicting determining the shape of cells in a honeycomb core.

Referring now to FIGS. 3A and 3B, an exemplary method for determining the shape of a pattern of cells which comprise the honeycomb core is disclosed. It should be understood that these methods make reference to geometrical shapes that can be represented as mathematical parameterizations or 3D CAD models, and that determination of the shapes disclosed herein can be done using basic mathematical principles or numerical methods, or CAD software.

FIG. 3A is an illustration of the steps for determining cell shapes, while FIG. 3B provides a depiction of an example cylindrical core geometry which illustrates an example of performing those steps. The desired cylindrical core geometry 350 is represented in this example as a hollow cylinder, with inner surface 352 and outer surface 354, and without the hexagonal cells depicted in FIG. 1. This core geometry represents the desired overall geometry that the honeycomb core will eventually have once all the ribbons are manufactured and joined together.

In step 300, a desired geometry of a honeycomb structure to be manufactured is selected and is provided in the form of an outer surface and an inner surface of the desired shape. This geometry can be represented with a CAD model or a mathematical description of the geometry. The hollow cylindrical geometry 350 depicted in FIG. 3B is an example of one specific desired shape. The desired geometry may include any of a wide variety of hollow tubular shapes with curvature, thickness, or cross-section variation, as described above.

The core geometry 350 depicted in FIG. 3B has an inner surface 352 and an outer surface 354. The inner surface 352 and outer surface 354 are both cylindrical but have different radii. The inner surface 352 is embedded within the outer surface 354 to form a hollow cylindrical tube with a thickness defined by the difference between the two radii. Ribbons (not depicted in this figure) used to manufacture this shape will have a height approximately equal to this thickness. This example shape is a simple hollow regular cylinder with a straight axis and constant cross-section.

The shape of each of the cells is determined by selecting a "shape" for the cells in the form of a desired two-dimensional cross-section (for example, a hexagon) and taking a projection of the selected two-dimensional cross-section onto the inner and outer surfaces of the cylinder. As described above, cells are typically formed in the shape of a hexagon, but many other shapes may also be selected.

In step 302, a desired cross-section and distance from the cross-section to the axis of the cylinder are selected. This desired two-dimensional cross-section is oriented such that the cross-section is normal to the radius of the cylinder at the center of the cross-section.

If the axis 360 of the cylinder 350 has no curvature, then it is beneficial for at least two edges in the desired two-dimensional cross-section to be approximately parallel to each other, as this provides surfaces for adjacent ribbons to be adhered together. These two edges correspond to node walls in the cells. Similarly, if the axis 360 of the cylinder 350 has curvature, it is beneficial for two edges in the desired two-dimensional cross-section to be parallel to the radius of curvature of the axis, as this facilitates connection between adjacent ribbons oriented parallel to the radius of curvature of the axis of the cylinder. Again, these two edges correspond to node walls in the cells. The orientation of these two edges corresponds to a "ribbon orientation," which is a direction along the surface of the core in which the ribbons will lie. These two edges should be roughly aligned with the ribbon orientation, so that these edges in adjacent ribbons will be parallel to each other.

In the example shown in FIG. 3B, a regular hexagon 356 is chosen as the desired two-dimensional cross-section 356, and the center 358 of the regular hexagon 356 is a desired distance X from the axis 360 of the cylinder 350.

In step 304, the two-dimensional cross-section is projected onto the outer and inner surfaces of the cylinder to form outer and inner faces of a cell, respectively. The projection may be done by drawing lines from the vertices of the cross-section to the axis of the cylinder. Preferably, the lines are drawn down to two points on the axis. To do this, the vertices of the cross-section are divided into two groups separated by a line perpendicular to axis 360 and passing through the center 358 of the cross-section 356. These two groups are on opposite sides of the center 358 of the cross-section. Lines from each vertex in the same group are drawn to the same point on the axis, as shown in FIG. 3B. Preferably, one of these lines is perpendicular to the axis, while the other lines are not necessarily perpendicular. The perpendicular lines are drawn from vertices lying on a plane parallel to the ribbon orientation, and bisecting the cross-section.

In FIG. 3B, lines 364 are drawn from the cross-section's vertices 366, to the axis 360 of the cylinder 350. This results in a wedge 368 running from the cross-section 356 to the axis 360 of the cylinder 350, and creates an inner projection 372 and an outer projection 370 on the inner surface 352 and outer surface 354, respectively.

In step 306, the vertices of the outer and inner faces are connected by edges to form the cell. The result is a cell shape and cell position for one cell of the honeycomb structure having thickness defined by the height of the walls of the cells. In FIG. 3B, the cell 362 can be seen.

In step 308, cell shapes and positions are determined for a sufficient number of cells on the entire cylindrical honeycomb structure as desired. If the cylinder is sufficiently regular in shape (e.g., has a constant cross-section, constant axis curvature or zero axis curvature), a determined cell shape can be repeated through a portion of or through the entire cylinder. In that situation, cell shapes need to only be determined once, or a limited number of times. If the cylinder is not sufficiently regular, cell shapes may be determined for each point on the cylinder as necessary.

For example, with a regular cylinder having a straight axis and a constant circular cross-section, the shape of the cells will be the same at any point on the cylinder, since the geometry of the cylinder is completely uniform.

On the other hand, with a tapered cylinder (i.e., a truncated cone or a cone shaped cylinder), the cell shape may vary from one end of the tapered cylinder to the other. However, if the tapered cylinder has radial symmetry (e.g., it has a circular cross-section decreasing in radius from one end of the cylinder to the other), then a pattern of cells can be repeated around the axis of symmetry (i.e., identical patterns of cells exist in the direction of the axis). Any of these types of symmetries are useful in determining to what extent ribbon geometries are identical throughout the cylinder (and therefore for choosing a desired ribbon orientation). Sequences of cell shapes which are identical to each other (even though all cells within in each sequence may not have the same shape) allow the creation of identically shaped ribbons, shaped to correspond to the identical sequences of cell shapes. The ribbon orientation is preferably chosen such that the ribbons are in the same direction as the identical sequences of cell shapes.

If the axis of the cylinder is curved, then the shapes of the cells vary in a direction traveling around the axis of the cylinder. If the axis of the cylinder has a constant curvature, then a form of symmetry exists (rotated around the axis of curvature), and patterns of cells in the direction of that symmetry exist which are identical (e.g., for a torus, or a portion of a torus, identical patterns of cells exist for cells wrapped around the axis of the cylinder). Additional such symmetries may be determined and are relevant for determining appropriate ribbon geometry which is discussed in more detail below.

FIGS. 4A-4D depict a method of determining the geometry of ribbons comprising honeycomb core. This method begins with step 400, by providing a representation, in mathematical terms, or in computer model form, of a honeycomb core cylinder having a defined pattern of cell shapes. This representation may either be pre-defined or may be determined using the disclosure provided above. The overall geometry of the honeycomb core, as well as the geometry of the cells are analyzed to determine the geometry of ribbons for forming the honeycomb core. The example geometry provided in FIGS. 4B-4D is a regular cylinder (straight axis, constant circular cross-section) with roughly identical hexagonal cells, but the principles disclosed herein may be applied to a wide variety of cylindrical geometries.

The computer model representation or mathematical representation of the cells in the cylinder is analyzed and "divided" to form at least one linear sequence of half-cells. The term "divided" refers to a mathematical or computer operation in which a defined geometry is "cut" by a surface such as a plane, to determine the shape of a portion of that defined geometry. The direction of the divide approximately follows the direction of the ribbon orientation. More specifically, the representation of cells in the cylinder is divided by a surface which runs adjacent to node walls of adjacent cells in the direction of the ribbon orientation. This surface is shaped to follow the ribbon orientation and to be adjacent to the node walls of the cells. Further, each surface alternately divides in half, and then runs adjacent to, the cells in the honeycomb core. To obtain a linear sequence of half-cells, in step 402, at least two such surfaces are provided—these two surfaces "enclose" a sequence of half-cells having alternating orientations. These dividing surfaces are also referred to herein as "dividing walls."

In FIG. 4B, two such dividing walls 451, 452 are shown. For clarity, FIG. 4B depicts only a small portion of cells in the cylinder 450. These walls run along the cylinder in a direction parallel to the axis 460 of the cylinder 450, and have a height 456 parallel to the radius 458 of the cylinder 350. Note that in this example, the ribbon orientation is in a direction parallel to the axis 460 of the cylinder, which is why the surfaces 451, 452 run in that direction.

In step 404, a linear sequence of half-cells is determined. This sequence is the result of performing a slicing operation (with, e.g., CAD software) on a model of the core with two adjacent dividing surfaces.

In FIG. 4B, between two adjacent dividing walls 451 and 452, a linear sequence of half-cells 470 is shown. This linear sequence of half-cells 470 comprises a series of half-cells in alternating orientation. Each of the half-cells has cell walls.

In step 406, the shape of each wall in the linear sequence of half-cells is determined. In FIG. 4B, the linear sequence of half-cells 470 possesses walls consisting of an alternating sequence of non-node walls 462 followed by node walls 464. The shape of all cell walls within the linear sequence of half cells should be determined. The shape of the linear sequence of half-cells is equivalent to the shape of a folded ribbon. The determination of this shape can be done using CAD software, or for simple geometries, by applying mathematical principles. If the geometry of the ribbon is sufficiently regular (i.e., if the ribbon comprises identical half-cells), then only a small portion of the geometry of the entire ribbon must be calculated—this portion can be repeated for the entire length of the ribbon.

In step 407, the geometry of a flat ribbon is determined based on the wall shapes from step 406. This is described in more detail with respect to FIG. 4D.

In step 408, steps 402 through 407 are repeated as needed for each type of ribbon required to form the desired cylindrical geometry. In FIG. 4B, which depicts a regular cylinder, only one type of ribbon geometry exists. Therefore, the geometry of the ribbon already determined may be used throughout the cylinder, and steps 402 through 406 need not be repeated.

FIG. 4C depicts a close-up of a portion of a representation of one full half-cell 470 (on the right side of the drawing) and a portion of another half-cell (on the left side of the drawing) for a honeycomb structure having a regular cylindrical geometry (constant circular cross-section, uncurved axis). Each half cell 470 depicted in this figure has two non-node walls 472 and one node wall 474. Vertices 476, 477, 478, 479, and edges 486, 487, 488, 489 of each of the walls 472, 474 are shown.

Node wall 474 has a top edge 486, a bottom edge 487, and two side edges 490. Non-node walls 472, have two side edges 490, a top edge 488 and a bottom edge 489. The top edge 486 and bottom edge 487 of the node-walls 474 are identical in length, as are the two side edges 490. The side edges 490 of the node walls 474 and non-node walls 472 are also identical in length and are at angle $\alpha$ with respect to each other. The angle $\alpha$ may be determined by extending a first line from vertex 479 perpendicular to the axis (not shown in this figure) and to a point on the axis, and extending a second line from vertex 483 to the same point on the axis. The angle between these two lines is equivalent to angle $\alpha$.

Top edge 488 and bottom edge 489 of non-node walls 472 have a curvature that conforms to the geometry of the core cylinder 450. Because the top edge 488 traces the outer surface 453 of the cylinder, and the bottom edge 489 traces the inner surface 455 of the cylinder, and because the outer surface 453 has a larger radius than the inner surface 455, the top edge 488 is longer than the bottom edge 489.

Top edge 488 is shaped like an arc section of an ellipse formed by intersecting a plane with the outer surface 453 of the cylinder 450. The plane is parallel to the radius of the cylinder and contains the two vertices 477, 476 of top edge 488. Similarly, the bottom edge 489 is shaped as an arc section of an ellipse formed by intersecting a plane with the inner surface of the cylinder. The plane is parallel to the radius of the cylinder and contains the two vertices 479, 478 of bottom edge 489. If the cells are shaped approximately as a regular hexagon, these planes may be approximated as planes parallel to the radius and rotated by approximately 120 degrees with respect to the axis. In FIG. 4C, these planes are not shown directly—only the intersection of the planes with the inner surface 455 and outer surface 453 of the cylinder respectively can be seen. These intersections are inner elliptical arc 492 and outer elliptical arc 494 which both follow the surface of the cylinder 450.

The calculations for determining the shape of edges 488-489 may be simplified by approximating edges 488-489 as arcs of a circle having a radius equivalent to the radius of the cylindrical surface on which the curved edges 488-489 lie. Further, the arc-length of the curved top or bottom edges may be approximated as ⊖·R, where ⊖ is equal to the angle traversed by the curved edges 488-489. These approximations are fairly suitable if the size of the cells is much smaller than the radius of the cylinder, but becomes less accurate as the size of the cell becomes closer to the size of the cylinder.

Although the ribbons are described and depicted above as being identical for all locations throughout the cylindrical core geometry, varying core geometries may require different ribbon geometries. For manufacturing purposes, it is beneficial to have the smallest number of ribbon geometries.

For certain cylindrical shapes, only one ribbon geometry needs to be made. For others, a small number of ribbon geometries need to be made. For the most complex cylindrical geometries, each ribbon would have to be customized for its location.

The presence of radial symmetry in a cylindrical geometry allows the use of identical ribbons running in a direction parallel to that symmetry. For example, a regular cylinder has radial symmetry around its axis, meaning that identical ribbons may be used if the ribbons run in the direction perpendicular to the axis of the cylinder. A tapered cylinder or a cylinder with a bulge in the middle similarly has radial symmetry around its axis, so identical ribbons may be used if the ribbons run in the direction parallel to the radius of the cylinder. Further, with a torus, which is a cylinder whose axis has a constant radius of curvature, identical ribbons may be used if they are positioned such that they are parallel to the major radius of the torus.

Although some cylinder geometries may not have any of these characteristics along their entire length, some cylinder geometries may nevertheless be broken down into sections, each of which have these characteristics (for example, multiple sections of a torus attached at their ends and rotated with respect to each other, or a torus section followed by a tapered straight cylindrical section). For such cylinders, each section may be made of identical ribbons.

Further, for any desired geometry which does not exactly match one of the "ideal" shapes having characteristics described above (such as symmetry), but almost matches such an ideal shape, an ideal shape may be manufactured using the above-described methodologies and then formed (e.g., the shape of the cylinder can be changed through the application of force) into the desired non-ideal shape. Although some forming would be required in this situation, the forming would be minimal in comparison with forming a shape from flat core material.

As shown in FIG. 4D, once the shapes of all of the edges, and thus the walls of the half-cells, are determined, the shape of a flat, non-folded ribbon 496 can be determined. The ribbon geometry depicted in FIG. 4B is appropriate for forming a regular cylinder having a constant circular cross-section and a straight axis. The shape of the non-folded ribbon 496 is a flat shape that comprises a succession of sections separated by fold lines, each section having a shape equivalent to a wall of each half-cell in the linear sequence of half-cells 470.

The sections have the same order and shape as the walls in the linear sequence 460. The shape of the edges of the sections is also the same as the shape of the corresponding edges of the walls. Thus, the first section 474 has the same shape as node wall 474, the second section 472 has the same shape as non-node wall 472, and so on. Further, the order of the sections in the flat ribbon 496 is the same as the order of the cell walls shown in FIGS. 4B and 4C.

The flat ribbon 496 shown in FIG. 4D is curved along its length. This curvature is not necessarily a smooth curve, but is formed by the alternating straight-curved-straight edges of the rectangular sections 472 and trapezoidal sections 474, and also due to the fact that all of the short edges of the trapezoidal sections 474 are pointed in the same direction. In addition to the specific ribbon geometry shown in FIG. 4D, curvature along the length of the flat ribbon may also be present with ribbon geometries cut to form other cylinder geometries. For every such cylindrical geometry, the curvature of curved flat ribbons that form the cylinder will be due to a combination of non-rectangular section shapes and curved section edges.

When the ribbon 496 shown in FIG. 4D is folded, the ribbon's edges become straight along the length of the ribbon as shown in FIG. 5. Some curvature exists in a direction corresponding to the curvature of the cylinder being formed. For ribbons used to form other cylinder geometries, such ribbons may not be straight along their lengths when folded. For example, for ribbons used to form a cylinder having a curved axis (and therefore an outer surface that is curved in the direction parallel to the direction of the axis), the corresponding folded ribbon may be curved along its length, to match the curved surface of the cylinder.

When the flat ribbon shape 496 is determined, a physical ribbon can be cut out of a base material such as metal or paper by conventional methods such as a stamp and press apparatus. This physical ribbon will then be folded to match the shape of the cells in the cylindrical core.

The edges 490 that separate the sections in the ribbon represent lines at which folds or bends will be made and are referred to herein as "fold lines." The flat ribbons are folded to form contoured ribbons with troughs and ridges that correspond to the linear sequence of half cells. The ribbons should be folded to angles such that the ribbons form the cells.

For the cell shape depicted in FIG. 4C, the direction of the fold is decided by which type of wall, node 474 or non-node 472, the fold lines 490 surround. If two fold lines 490 surround a node wall 474, then the folds made at both of those fold lines should be made in the same direction as each other. If two fold lines surround a non-node wall 472, then the folds made at both of these fold lines should be made in a direction opposite to each other. In this way, a repeating pattern of two folds in one direction followed by two folds in the opposite direction is made, and a series of semi-hexagonal half-cells is formed. The angle of the folds is determined by the shape of the half cells. For regular hexagons, the folds are made at approximately 120 degrees.

As shown in FIG. 5, the ribbons 496, once cut and folded, are joined together to form a linear series of hexagonal cells that comprise the cylindrical core. The ribbons should be joined together at their node walls 474. Ribbons are added in this manner until a number of ribbons required for the desired core geometry have been bound together.

If the ribbons were pre-folded, the cylindrical core is completed. Alternatively, if the ribbons were simply pre-stressed, then when it is desired to assemble the full structure, the ribbons may be pulled apart such that the structure is expanded and the ribbons are formed into the final desired structure. The expanded assembly of ribbons may be cured or otherwise solidified into the appropriate geometry.

The teachings of this disclosure can be used to make a curved honeycomb core in a wide variety of geometries while requiring minimal forming.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

We claim:

1. A ribbon for manufacturing a honeycomb structure having a curved core surface geometry, the ribbon having a first ribbon side edge, a second ribbon side edge, a ribbon top edge and a ribbon bottom edge, the ribbon top edge and the ribbon bottom edge extending from the first ribbon side edge to the second ribbon side edge, the ribbon comprising a continuous series of alternating rectangular sections and trapezoidal sections formed by spaced-apart fold lines extending from the ribbon top edge to the ribbon bottom edge, said trapezoidal sections having an elliptical top edge and an elliptical bottom edge.

2. The ribbon of claim 1, wherein when the ribbon is in a folded state, at least a portion of the ribbon top edge and the ribbon bottom edge are shaped to match said curved core surface geometry of said honeycomb structure.

3. The ribbon of claim 1, wherein each of the alternating sections has a section top edge and a section bottom edge, and the section top edge and the section bottom edge in at least one the foldable sections are curved to match said curved core surface geometry of said honeycomb structure.

4. The ribbon of claim 3, wherein the elliptical top edge and elliptical bottom edge are curved to match said curved core surface geometry of said honeycomb structure.

5. The ribbon of claim 4, wherein:

the elliptical top edge of each of said trapezoidal sections is curved to match the geometry of an outer core surface of the honeycomb structure; and the elliptical bottom edge of each of said trapezoidal sections is curved to match the geometry of an inner core surface of the honeycomb structure.

6. The ribbon of claim 1, wherein when the ribbon is folded at the fold lines, the rectangular sections and trapezoidal sections form a series of semi-hexagonal shapes.

7. The ribbon of claim 1, wherein the sections in the continuous series of foldable sections have a shape equivalent to the shape of a wall of at least one honeycomb cell in a plurality of honeycomb cells in the honeycomb structure.

8. The ribbon of claim 7, wherein:

the ribbon has a ribbon orientation comprising a direction within the honeycomb structure in which the ribbon is designed to lie; and the continuous series of foldable sections comprises a continuous series of sections shaped such that adjacent sections have a shape equivalent to the shape of adjacent walls of cells which lie in the direction of the ribbon orientation.

9. A ribbon for manufacturing a honeycomb structure having a plurality of honeycomb cells, an inner core surface, an outer core surface, and a curved core surface geometry, the ribbon comprising a continuous series of foldable sections arranged in sequence along the length of the ribbon, each of the foldable sections having a section top edge and a section bottom edge, and the section top edge and the section bottom edge in at least one the foldable sections being curved to match said curved core surface geometry of said honeycomb structure, the continuous series of foldable sections comprising alternating rectangular sections and trapezoidal sections formed by spaced-apart fold lines extending from a ribbon top edge to a ribbon bottom edge, said trapezoidal sections having an elliptical top edge and an elliptical bottom edge, such that when the ribbon is folded at the fold lines, the rectangular sections and trapezoidal sections form a series of semi-hexagonal shapes.

10. The ribbon of claim 9, wherein the continuous series of foldable sections comprises an alternating series of curved sections and non-curved sections, the section top edge and the section bottom edge of each of the curved sections are curved to match said curved core surface geometry of said honeycomb structure.

11. The ribbon of claim 10, wherein:

each section top edge of said curved sections is curved to match the geometry of the outer core surface of the honeycomb structure; and each section bottom edge of said curved sections is curved to match the geometry of the inner core surface of the honeycomb structure.

12. The ribbon of claim 9, wherein the sections in the continuous series of foldable sections have a shape equivalent to the shape of a wall of at least one honeycomb cell in said plurality of honeycomb cells.

13. The ribbon of claim 9, wherein:

the ribbon has a ribbon orientation comprising a direction within the honeycomb structure in which the ribbon is designed to lie; and the continuous series of foldable sections comprises a continuous series of sections shaped such that adjacent sections have a shape equivalent to the shape of adjacent walls of cells which lie in the direction of the ribbon orientation.

14. A honeycomb structure having a plurality of honeycomb cells, an inner core surface, an outer core surface, and a curved core surface geometry, said honeycomb structure comprising a plurality of ribbons according to claim 9 folded to form a continuous series of half-cells, each of the half-cells having a shape approximately equivalent to half of the shape of a honeycomb cell in said plurality of honeycomb cells, and lined up side-by-side in a direction of a ribbon orientation to form the plurality of honeycomb cells.

15. The honeycomb structure of claim 14, wherein:

within each ribbon in said plurality of ribbons, the continuous series of sections comprise node-walls and non-node-walls;

the node-walls are substantially aligned with the ribbon orientation.

16. The honeycomb structure of claim 15, wherein:

the honeycomb structure has a constant cross-section along its axis;

each of the node-walls in each of the ribbons is identically shaped; and each of the non-node walls in each of the ribbons is identically shaped.

17. The honeycomb structure of claim 14, wherein:

the honeycomb structure has a cylindrical shape with a straight axis;

the ribbon orientation is in a direction parallel to the axis; and each of the ribbons is identically shaped.

18. The honeycomb structure of claim 14, wherein:

the honeycomb structure has a cylindrical shape, an axis with a constant curvature, and a constant cross-section along its axis;

the ribbon orientation is in a direction perpendicular to the axis; and each of the ribbons identically shaped.

19. The honeycomb structure of claim 14, wherein:

the honeycomb structure is comprised of multiple cylindrical sections, each of which possess ribbons that have shapes that are identical to the shapes of other ribbons in the same cylindrical section, but which need not have identical shapes to ribbons in other cylindrical sections.

20. The honeycomb structure of claim 14, wherein the honeycomb cells are shaped as a tapered wedge having inner and outer hexagonally shaped faces, wherein the inner face has an area smaller than an area of the outer face.

21. A honeycomb structure having a plurality of honeycomb cells, an inner core surface, an outer core surface, and a curved core surface geometry, the honeycomb cells having a tapered wedge shape with an inner hexagonally shaped face and an outer hexagonally shaped face, the inner hexagonally shaped face having an area smaller than an area of the outer hexagonally shaped face, said honeycomb structure comprising a plurality of ribbons folded to form a continuous series of half-cells, each of the half-cells having a shape approximately equivalent to half of the shape of a honeycomb cell in said plurality of honeycomb cells, and lined up side-by-side in a direction of a ribbon orientation to form the plurality of honeycomb cells, the ribbon comprising a continuous series of foldable sections arranged in sequence to form the ribbon, and a ribbon top edge and a ribbon bottom edge being curved when the ribbon is in a flat, unfolded state.

22. The honeycomb structure of claim 21, wherein:

within each ribbon in said plurality of ribbons, the continuous series of sections comprise node-walls and non-node-walls;

the node-walls are substantially aligned with the ribbon orientation.

23. The honeycomb structure of claim 22, wherein:

the honeycomb structure has a constant cross-section along its axis;

each of the node-walls in each of the ribbons is identically shaped; and each of the non-node walls in each of the ribbons is identically shaped.

24. The honeycomb structure of claim 21, wherein:

the honeycomb structure has a cylindrical shape with a straight axis;

the ribbon orientation is in a direction parallel to the axis; and each of the ribbons is identically shaped.

25. The honeycomb structure of claim 21, wherein:

the honeycomb structure has a cylindrical shape, an axis with a constant curvature, and a constant cross-section along its axis;

the ribbon orientation is in a direction perpendicular to the axis; and each of the ribbons identically shaped.

26. The honeycomb structure of claim 21, wherein:

the honeycomb structure is comprised of multiple cylindrical sections, each of which possess ribbons that have shapes that are identical to the shapes of other ribbons in the same cylindrical section, but which need not have identical shapes to ribbons in other cylindrical sections.

27. A ribbon for manufacturing a honeycomb structure having a plurality of honeycomb cells, an inner core surface, an outer core surface, and a curved core surface geometry, the ribbon comprising a ribbon top edge, a ribbon bottom edge and a continuous series of foldable sections arranged in sequence along the length of the ribbon, the ribbon top edge and the ribbon bottom edge being curved along the length of the ribbon when the ribbon is in a flat, unfolded state, said continuous series of foldable sections comprising a continuous series of alternating rectangular sections and trapezoidal sections formed by spaced-apart fold lines extending from the ribbon top edge to the ribbon bottom edge, said trapezoidal sections having an elliptical top edge and an elliptical bottom edge, such that when the ribbon is folded at the fold lines, the rectangular sections and trapezoidal sections form a series of semi-hexagonal shapes.

28. The ribbon of claim 27, wherein when the ribbon is in a folded state, at least a portion of the ribbon top edge and the ribbon bottom edge are shaped to match said curved core surface geometry of said honeycomb structure.

29. The ribbon of claim 27, wherein each of the foldable sections has a section top edge and a section bottom edge, and the section top edge and the section bottom edge in at least one the foldable sections are curved to match said curved core surface geometry of said honeycomb structure.

30. The ribbon of claim 29, wherein the continuous series of foldable sections comprises an alternating series of curved sections and non-curved sections, the section top edge and the section bottom edge of each of the curved sections are curved to match said curved core surface geometry of said honeycomb structure.

31. The ribbon of claim 30, wherein:

each section top edge of said curved sections is curved to match the geometry of the outer core surface of the honeycomb structure; and each section bottom edge of said curved sections is curved to match the geometry of the inner core surface of the honeycomb structure.

* * * * *